Oct. 30, 1945.  L. RUSSELL  2,388,085
SUPPLEMENTARY FUEL INJECTION CONTROL STRUCTURE
Filed Aug. 31, 1944  2 Sheets-Sheet 1

INVENTOR
Loren Russell
by Charles H. Hills
Attys

Oct. 30, 1945.   L. RUSSELL   2,388,085
SUPPLEMENTARY FUEL INJECTION CONTROL STRUCTURE
Filed Aug. 31, 1944   2 Sheets-Sheet 2
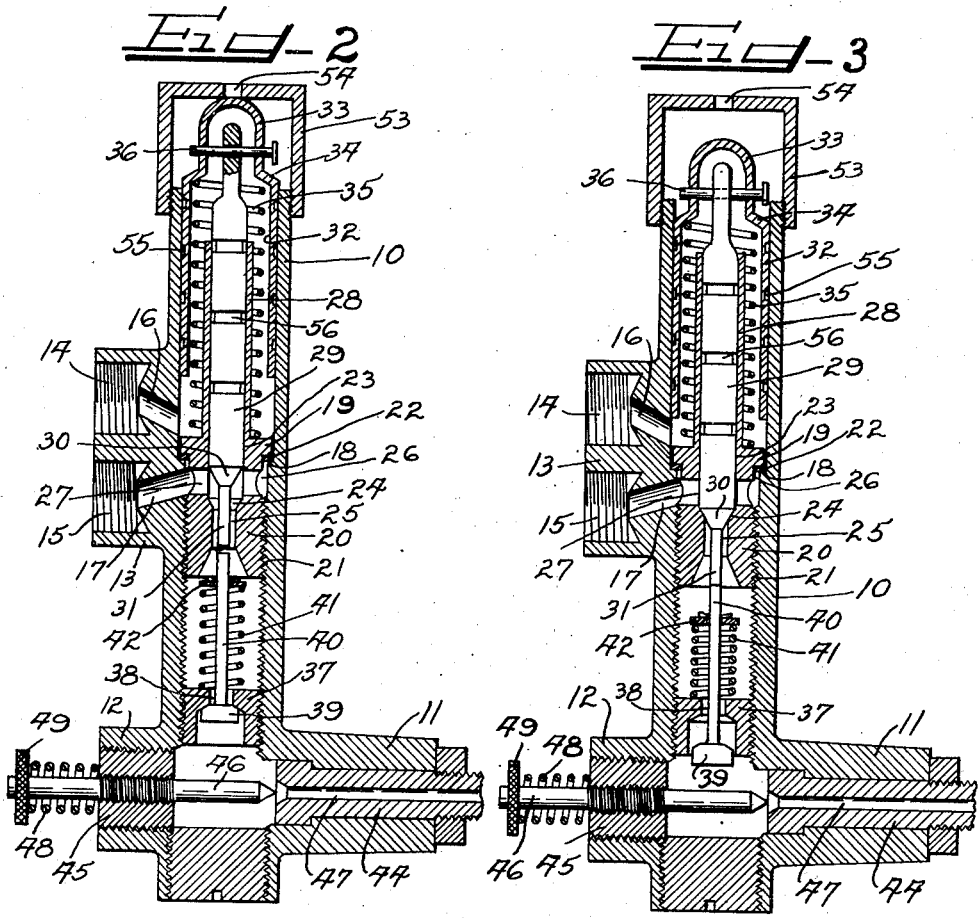
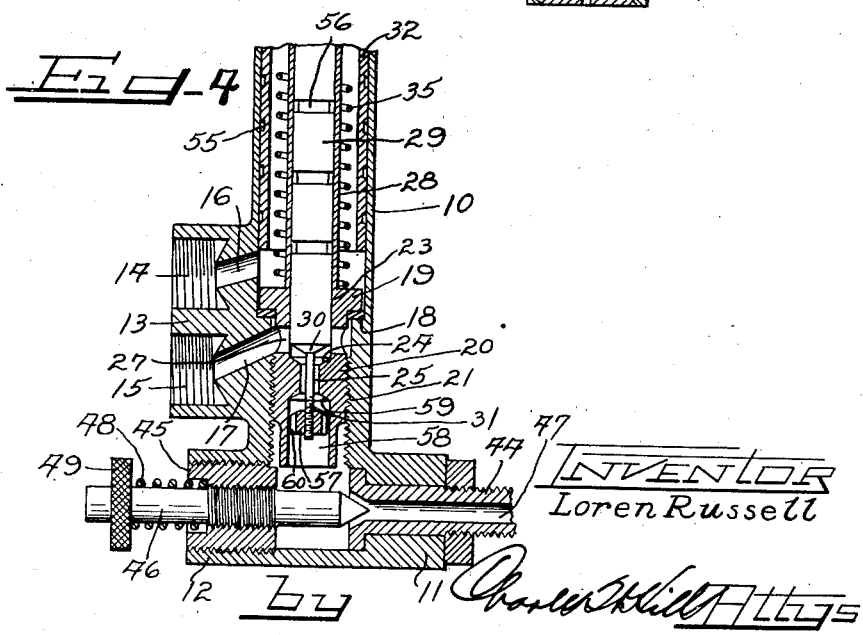
Inventor
Loren Russell Patented Oct. 30, 1945

2,388,085

UNITED STATES PATENT OFFICE 2,388,085

SUPPLEMENTARY FUEL INJECTION CONTROL STRUCTURE

Loren Russell, New York, N. Y., assignor to Vita-Meter Corporation, New York, N. Y., a corporation of Delaware Application August 31, 1944, Serial No. 552,144

6 Claims. (Cl. 123—127)

My invention relates to supplementary fuel supply structure for internal combustion engines, and particularly to improved valve structure for controlling the delivery of supplementary antiknock fuel to an internal combustion engine at the carburetor, intake manifold, or at other points to be received in the air flow stream or the power fuel-air stream to the engine.

In prior structures for the feeding of supplementary fuel, more or less complicated valving structure and a fuel float chamber are assembled in a unitary structure mounted on or adjacent to the carburetor. Such unitary structures are comparatively large and cumbersome and convenient space therefor is not always available.

An important object of my invention is to provide a simple, compact and economically manufactured valve structure for receiving the supplementary fuel from a supply tank which may be remote from the valve structure, and with this comparatively small valve structure conveniently mounted directly on the carburetor or at any other point on the engine for delivery of the supplementary fuel.

Another object is to provide simple and compact valve structure which will efficiently function for feeding of supplementary fuel in required quantity at such times as it is needed to stop engine knocking, and to quickly shut off the supplementary fuel flow from the engine when it is not required.

My invention will be clearly understood from the following detail specification in connection with the drawings, on which drawings:

Figure 2 is an enlarged longitudinal section of the valve structure showing the valve closed;

Figure 3 is a similar section showing the valve open; and

Figure 4 shows a modified valve arrangement.

Figure 1:
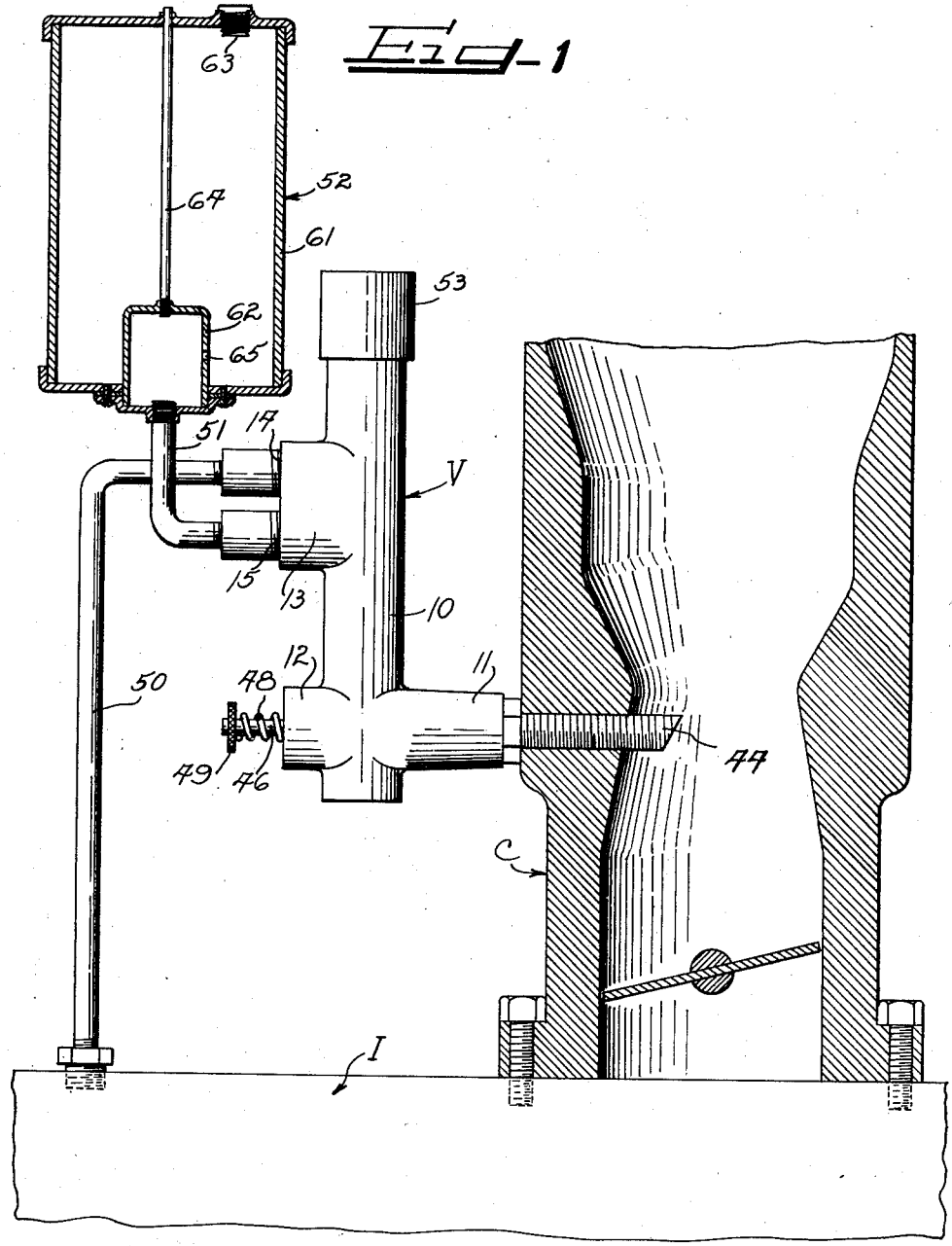
Figure 1 shows the connection between the valve structure and a supply tank and the engine to be served.

The housing for the valve structure V comprises the tubular body 10 having at its lower end the tubular flanges 11 and 12 extending in opposite directions therefrom. Intermediate the tube ends a laterally extending boss 13 provides passageways 14 and 15 connected by ports 16 and 17 respectively with the interior of the body 10. Above the port 17 the body 10 is of increased internal diameter to provide a shoulder 18 which receives the flange 19 of the valve seat plug 20 which, below the port 17, has threaded connection 21 with the body, a washer 22 being preferably interposed between the flange 19 and the shoulder 18 to form a seal connection.

The seat plug has the axial bore 23 therethrough, this bore being contracted to provide a conical valve seat 24 and to leave a valve port 25, the valve seat being a short distance below the inlet port 17 which communicates with the circumferential channel 26 in the seat plug 20 below the plug flange 19, passages 27 connecting this channel with the bore 23 above the seat 24.

Extending upwardly from the seat plug 20 to form a continuation of the bore 23 is the sleeve 28 which may be integral with the seat plug, and extending through this sleeve and the bore 23 is the cylindrical valve stem 29 which has the conical valve end 30 for cooperation with the seat 24 on the seat plug. Below this conical valve end 30 the stem end 31 is of reduced diamter to extend down through the port 25.

Slidable within the body 10 above the port 16 is a hollow piston or plunger 32 closed at its upper end 33 and contracted to leave the internal abutment shoulder 34, a calibrated spring 35 within the piston abutting at its ends against the shoulder 34 and the valve seat plug flange 19. The valve stem 29 extends at its upper end into the end 33 of the plunger and is connected thereto as by a pin 36.

In the housing body 10, just above the flanges 11 and 12, is the valve seat 37 having the port 38. Below this valve seat is the shut off valve 39 whose stem 40 extends upwardly through the port 38. A spring 41 encircles the valve stem between the seat 37 and the collar 42 on the upper end of the stem and tends to hold the valve up in seating engagement with the seat 37 to close the port 38. The valve stem 40 is in the path of the lower end 31 of the valve stem 29 so that when the valve stem 29 is moved down for closure movement of the valve 30, the valve 39 will be unseated and moved away from the port 38.

Within the flange 11 at the lower end of the housing 10 is the discharge tube 44, and within the flange 12 is a bushing 45 through which threads metering pin 46 whose conical inner end cooperates with the inner end of the tube 44 to meter the flow through the bore 47 of the tube. A spring 48 on the metering pin between the bushing and the pin head 49 serves to hold the pin in set position.

As shown on Figure 1, the valve assembly V may be mounted directly on a carburetor C with the discharge tube 44 projecting into the venturi of the carburetor. The passageway 14 in the valve housing is connected by tubing 50 with the intake manifold 1. The passageway 15 of the valve body is connected by tubing 51 with a tank structure 52 in which is contained the supplementary antiknock fuel, such as water and alcohol, the tank being of the constant hydraulic head type.

At its upper end the tubular body 10 of the valve assembly is closed by a cap 53 which is threaded to the body in order to provide an adjustable stop for limiting the upward movement of the piston 32, the cap having a vent passageway 54 for air flow. The outer end of the piston is thus subjected to atmospheric air pressure while the interior of the piston is subjected to vacuum in the intake manifold. To prevent leakage of air between the piston and the housing wall, the piston should have seal fit in the housing. By providing the piston with the number of circumferential shallow channels 55 the piston may readily move axially in the housing 10 but air leak between the piston and the housing wall will be prevented. The vacuum flow within the piston tends to move the valve stem 29 downwardly for closure movement of the valve 30, but the spring 35 will resist such movement and will tend to shift the piston and the valve stem upwardly for opening of the valve.

When the valve 30 is opened, supplementary fuel may flow through the passageways 27 in the seat plug 20 and into the port 25 for flow into the housing body 10 below the seat plug. In order to seal this fluid flow from the vacuum within the piston, the valve stem 29 has seal fit in the sleeve 28, and the stem may be provided with circumferential channels 56 so that the stem may move freely within the sleeve but flow of fluid between the sleeve and the stem will be prevented.

Describing now the operation, the movement of the valve 30 in closing direction is caused by the differential between atmosphere pressure and intake manifold pressure, and such movement of the valve is resisted by the calibrated spring 35 which tends to shift the valve to its fully open position. The valve 30 functions as a primary valve for the flow of supplementary fuel, and the metering valve 46 controls the rate of flow of the supplementary fuel to the carburetor. When the engine is at rest, and there is no vacuum, the calibrated spring 35 will hold the primary valve 30, wide open as shown on Figure 2, with the reduced end 31 of the stem 29 displaced a short distance above the upper end of the stem 40 of the shut off valve 39 so that the spring 41 may hold this shut off valve against the seat 37 to close the port 38 against flow of supplementary fuel to the carburetor.

As the engine is now started and vacuum begins, the vacuum starts counteracting calibrated spring 35 for movement of the primary valve toward closed position, and at the beginning of this valve movement it engages with the shut off valve stem and quickly moves the shut off valve away from the seat 37 for wide opening of the port 38, so that maximum amount of supplementary fuel will be delivered to the carburetor during the lower vacuum condition at which there is apt to be the greatest knocking. As the vacuum now increases and the primary valve is brought closer toward closed position, this primary valve will control the fuel flow of gradual reduction in flow volume until the vacuum reaches a point where no further supplementary fuel is necessary. For example, the particular engine served might have no knock tendency when the vacuum reaches say about seven inches of mercury pressure. When this limit is reached the primary valve will be completely closed to shut off all flow of supplementary fuel to the carburetor, as shown on Figure 3, the shut off valve 39 being then at its lower end of movement with the port 38 still wide open. Should the vacuum now drop, the calibrated spring 35, will then, in proportion to the dropping vacuum pressure, open the primary valve and, as the drop in vacuum continues, there will be a correspondingly greater volume of flow of supplementary fuel to the carburetor, the shut off valve still keeping the port 38 wide open, and as soon as the vacuum has dropped to approach the knocking stage, the primary valve will be moved by the spring toward its wide open position for correspondingly increased flow of supplementary fuel up to the maximum flow thereof, and then, when the engine is stopped or there is no further vacuum, the primary valve will be wide open but the shut off valve will have been released from the primary valve to be returned to its closed position by its spring to shut off supplementary fuel flow to the carburetor as shown on Figure 2. Thus, as the engine operates between low and maximum vacuum conditions, the primary valve will be jointly controlled by the vacuum and the calibrated spring to deliver supplementary fuel flow necessary for efficient knock prevention. The metering valve 46 is set in accordance with the characteristics of the engine to be served so that the outflow of the supplementary fuel into the carburetor is metered for flow volume in accordance with the varying vacuum conditions to most effectively prevent knocking. The supplementary fuel may be injected into the carburetor, as shown, or into the intake manifold, or at any other point where it may be receive by an inflowing air stream or power fuel-air-stream, and the vacuum for controlling the operation of the valve structure may be taken from the intake manifold, as shown, or from any other point in the engine vacuum line.

In the modified arrangement shown on Figure 4, the shut off valve 57 is carried directly by the primary valve stem 29. The shut off valve may be of material such as rubber and may be threaded onto the lower end of the reduced extension 31 of the primary valve stem to move therewith in the cylindrical bore 58 in the lower end of the seat plug 20 for cooperation with the seating surface 59. The valve 57 has passageways 60 therethrough for flow of the supplementary fuel. Figure 4 shows the primary valve 30 slightly unseated for flow of supplementary fuel, the shut off valve being substantially wide open. Under increasing vacuum the primary valve will be moved toward closing position and will be fully closed when the vacuum reaches the critical value at which no further feed of supplementary fuel is required. Should the vacuum decrease, then the calibrated spring 35 will move the valve for opening for corresponding fuel flow, and when the engine is stopped or there is no vacuum, the primary valve will be wide open but the shut off valve will have been carried up into engagement with the seat 59 to shut off supplementary fuel flow.

In the valve structures shown on Figures 2 and 3 the cap 53 is adjusted to limit the upward movement of the piston and thereby the opening movement of the primary valve. In the structure on Figure 2, the adjustment of the cap is such that the primary valve may move sufficiently in opening direction to clear the upper end of the stem of the shut off valve 39 so that the spring in the shut off valve may fully close this valve. In the structure shown on Figure 4, the cap 53 is adjusted so that, before the piston is stopped by the cap, the primary valve may, at the end of its upward movement, exert sufficient upward pressure on the shut off valve to hold it securely against the seat 59 for complete fuel shut off.

The feed of supplementary fuel to the valve structure is preferably entirely by gravity under a constant hydraulic head. On Figure 1 I have shown a simple compact tank structure from which the supplementary fuel is fed under a constant hydraulic head, and which tank structure may be remote from the valve structure for installation at any convenient location in the engine compartment of the vehicle. Briefly describing the tank structure 52, it comprises a main tank 61 which may be of any desired shape, and at the bottom of which is the constant level delivery tank 62 which is connected by the duct 51 with the fuel inlet 15 of the valve structure. The main tank 61 has a filler plug 63 in its top wall, which, when closed, forms a seal fit so that the main tank has no direct connection with the atmosphere. Extending upwardly from the upper end of the tank 62 and through the top wall of the main tank is an air vent pipe 64. In the side wall of the feed tank 62 is an orifice or opening 65 through which the supplementary fuel may flow from the main tank 61 into the tank 62. When supplementary fuel flows from the tank 62 the level therein will drop, which drop is permitted by the air vent 64. As soon as this level in the tank 62 drops below the level of the upper edge of the opening 65, air may flow from the upper part of the tank 62 through the upper end of the opening 65 into the main tank 61 to break the vacuum at the top of the main tank so that fuel may flow into the delivery tank 62 until the level therein is restored to the upper end of the opening 65 and further flow from the main tank 61 to the delivery tank will be stopped. Thus the supplementary fuel will be delivered under a constant hydraulic head from the tank 62 to the valve structure. With this constant hydraulic head feed of fuel to the valve structure, the metering valve 46 may accurately control the proper feed of supplementary fuel to the engine for the most efficient elimination of engine knocking.

The supplementary fuel fed past the metering valve is drawn into the manifold and thence into the combustion chambers in the usual manner by vacuum created by the engine operation.

I have disclosed an efficient and practical embodiment of the features of my invention but I do not desire to be limited to the exact construction, arrangement or operation shown and described as changes and modifications may be made without departing from the scope of the invention as defined by the appended claims.

I claim as my invention:

1. A valve structure for controlling the feed of supplementary fuel to an internal combustion engine comprising a housing, having an inlet for supplementary fuel and an outlet passageway for flow of fuel to the engine, a primary valve in said housing, a calibrated spring tending to move said valve in opening direction, means within said housing connected with said valve and adapted to be subjected to vacuum of the engine tending to move said valve in closing direction whereby said spring and vacuum will conjointly control the volume of flow of supplementary fuel into said housing for discharge therefrom through said outlet passageway, and a shut off valve in said housing between said primary valve and said outlet passageway movable with said primary valve to be opened for fuel flow through said outlet passageway when said primary valve is fully closed and to shut off flow to said outlet passageway when said primary valve is fully opened.

2. A valve structure for controlling the feed of supplementary fuel to an internal combustion engine comprising a housing having an inlet for supplementary fuel and an outlet passageway for flow of fuel to the engine, a primary valve in said housing, a calibrated spring tending to move said valve in opening direction, means within said housing connected with said valve and adapted to be subjected to vacuum of the engine tending to move said valve in closing direction whereby said spring and vacuum will conjointly control the volume of flow of supplementary fuel into said housing for discharge therefrom through said outlet passageway, and a shut off valve in said housing between said primary valve and said outlet passageway movable with said primary valve to be opened for fuel flow through said outlet passageway when said primary valve is fully closed and to shut off flow to said outlet passageway when said primary valve is fully opened, and a metering valve for controlling the flow through said outlet passageway.

3. A valve structure for controlling the feed of supplementary anti-knock fuel to an internal combustion engine comprising a housing having an inlet for supplementary fuel and an outlet passageway for flow of the fuel for delivery to the engine, a primary valve in said housing and a seat therefor having a port connected with said fuel inlet, a calibrated spring tending to move said primary valve away from said port for flow therethrough, a piston within said housing connected with said primary valve, a passageway in said housing for connection with engine vacuum for moving said piston for movement of said primary valve away from said port whereby said spring and vacuum will conjointly control the flow through said port, a shut off valve in said housing and a seat therefor, said shut off valve being movable with said primary valve for closure when said primary valve reaches the end of its opening movement and for movement away from its seat when said primary valve is moved in closing direction and a metering valve for metering the flow through said outlet passageway.

4. A valve structure for controlling the feed of anti-knock supplementary fuel to an internal combustion engine comprising a tubular housing having a valve seat therein and an outlet passageway from one end thereof for flow of supplementary fuel to the engine, said housing having an inlet passageway for supplementary fuel, said valve seat having a port for connection with said fuel inlet, a primary valve for said port having a stem, a sleeve extending from said seat for receiving said stem, a piston in said housing above said seat connected with said stem, a calibrated spring within said housing tending to move said piston and primary valve for opening movement of said valve, a passageway in said housing above said seat for connection of engine vacuum with said housing for moving said piston and primary valve for closing movement of said valve whereby said spring and vacuum will conjointly control the fuel flow into said housing through said port, a shut off valve seat in the lower end of said housing between said primary valve seat and said outlet passageway, and a shut off valve movable with said primary valve for seating on its seat only after the primary valve has reached a final open position and to be unseated from its seat as soon as said primary valve moves from its open position back towards its closed position.

5. A valve structure for controlling the feed of anti-knock supplementary fuel to an internal combustion engine, comprising a housing having a bore therethrough and an outlet passageway from the lower end thereof for flow of supplementary fuel to the engine, a valve seat plug in said bore intermediate the bore ends, said housing having a supplementary fuel inlet passageway adjacent to said seat plug, said seat plug having a port therethrough and passageways for connection of said port with said fuel inlet, a primary valve extending downwardly into said seat plug for controlling said port and having an upwardly extending stem, a sleeve extending upwardly from said seat plug in which said stem has sliding and sealing fit, a tubular piston closed at its upper end and slidable in said bore with sealing fit and connected with the upper ends of said stem, a passageway in said housing above said seat plug for connection of engine vacuum with the interior of said piston, said vacuum tending to move said piston downwardly for movement of said primary valve for closure of said port, a calibrated spring resisting movement of the piston by the vacuum and tending to shift the piston outwardly for opening movement of the primary valve whereby said spring and vacuum will conjointly control the movement of said primary valve for control thereby of the flow through said port into the lower end of said bore, and a shut off valve in the lower end of said bore between said primary valve and said fuel outlet passageway, said shut off valve being movable with said primary valve to shut off the flow to said outlet passageway after said primary valve has reached a predetermined open position and to be opened for free flow to said outlet passageway when said primary valve is moved toward closing position.

6. In a valve structure for the purpose described, a housing having an outlet passageway for flow of supplementary fuel to an internal combustion engine, a primary valve structure in said housing conjointly controlled by calibrated spring pressure in one direction and vacuum pressure in the opposite direction for control of the flow of supplementary fuel to said outlet passageway, a shut off valve structure in said housing movable with said primary valve structure to shut off the fuel flow to said outlet passageway when said primary valve structure reaches a predetermined open position and to be opened for free flow of fuel to said outlet passageway as soon as said primary valve is started towards closing position, and a metering valve for controlling the flow through said outlet passageway.

LOREN RUSSELL.